US010327045B2

(12) United States Patent
Li et al.

(10) Patent No.: US 10,327,045 B2
(45) Date of Patent: Jun. 18, 2019

(54) IMAGE PROCESSING METHOD, IMAGE PROCESSING DEVICE AND MONITORING SYSTEM

(71) Applicant: Sony Corporation, Tokyo (JP)

(72) Inventors: Liang Li, Beijing (CN); Deng Zhang, Beijing (CN); Kun Liu, Beijing (CN); Xiong Yin, Beijing (CN)

(73) Assignee: SONY CORPORATION, Tokyo (JP)

( * ) Notice: Subject to any disclaimer, the term of this patent is extended or adjusted under 35 U.S.C. 154(b) by 253 days.

(21) Appl. No.: 14/708,636

(22) Filed: May 11, 2015

(65) Prior Publication Data
US 2015/0326833 A1 Nov. 12, 2015

(30) Foreign Application Priority Data

May 12, 2014 (CN) .......................... 2014 1 0197226

(51) Int. Cl.
*H04N 21/8549* (2011.01)
*H04N 7/18* (2006.01)
*H04N 21/218* (2011.01)
*H04N 5/232* (2006.01)
*H04N 5/247* (2006.01)
*G06T 3/00* (2006.01)

(52) U.S. Cl.
CPC ....... *H04N 21/8549* (2013.01); *G06T 3/0087* (2013.01); *H04N 5/23238* (2013.01); *H04N 5/247* (2013.01); *H04N 7/181* (2013.01); *H04N 21/21805* (2013.01)

(58) Field of Classification Search
CPC .................... H04N 5/23238; H04N 21/8549
See application file for complete search history.

(56) References Cited

U.S. PATENT DOCUMENTS

| 5,649,032 A * | 7/1997 | Burt ........................ G06K 9/32 348/588 |
| 6,597,801 B1 * | 7/2003 | Cham ................ G06K 9/00369 345/474 |
| 2007/0031062 A1 * | 2/2007 | Pal ..................... G06F 17/30843 382/284 |
| 2007/0237420 A1 * | 10/2007 | Steedly ................... G06K 9/32 382/284 |
| 2013/0176384 A1 * | 7/2013 | Jones ................ H04N 5/23238 348/36 |
| 2014/0266988 A1 * | 9/2014 | Fisher .................. G02B 27/017 345/8 |

(Continued)

*Primary Examiner* — Rowina J Cattungal
(74) *Attorney, Agent, or Firm* — Xsensus, LLP

(57) ABSTRACT

The disclosure relates to an image processing method and image processing device for a monitoring system including multiple camera devices, and a monitoring system. The image processing method includes: extracting a key frame from a video acquired by each of the plurality of camera devices; for each of the extracted key frames, determining a neighbor camera device having monitor area adjacent to the monitor area of the key frame, and acquiring from the neighbor camera device a corresponding video frame which is simultaneous to the key frame; blending the key frame extracted from each of the camera devices and the corresponding video frame to generate a panorama key frame; and generating a sequence formed by panorama key frames for the key frames as a video abstract of the monitoring system.

14 Claims, 4 Drawing Sheets

(56) References Cited

U.S. PATENT DOCUMENTS

2014/0270537 A1\* 9/2014 Lo .......................... G06T 11/60
                                                                    382/195
2014/0347439 A1\* 11/2014 Jia ...................... H04N 5/23238
                                                                    348/36

\* cited by examiner

IMAGE PROCESSING METHOD, IMAGE PROCESSING DEVICE AND MONITORING SYSTEM

FIELD

The present disclosure generally relates to the field of monitoring, and more particularly to an image processing method and an image processing device for a monitoring system including multiple camera devices, and a monitoring system.

BACKGROUND

Video abstract technique may be applied to a video monitoring system. A video abstract is a summary of a video content obtained by a monitoring system. For example, a segment containing a moving target may be extracted by means of target motion analysis, etc., to concentrate an original video. The content of the video obtained by the monitoring system can be learned quickly based on the video abstract, e.g., by browsing an object, an event or the like appearing in a monitor area.

SUMMARY

A brief overview of the embodiment of the present disclosure is given hereinafter in order to provide a basic understanding regarding some aspects of the present disclosure. It should be understood that the following summary is not an exhaustive overview of the disclosure. It is neither intended to determine the key or critical part of the present disclosure, nor intended to limit the scope of the present disclosure. Its purpose is merely to present some concepts in a simplified form as a procedure of the more detailed description that will be discussed later.

According to an aspect of the present disclosure, an image processing method for a monitoring system including multiple camera devices is provided. The method includes the steps of: extracting a key frame from a video acquired by each of the plurality of camera devices; for each extracted key frame, determining a neighbor camera device having monitor area adjacent to the monitor area of the key frame, and acquiring from the neighbor camera device a corresponding video frame which is simultaneous to the key frame; blending the key frame extracted from each of the camera devices and the corresponding video frame to generate a panorama key frame; and generating a sequence formed by panorama key frames for the key frames as a video abstract of the monitoring system.

According to another aspect of the present disclosure, an image processing device for a monitoring system including multiple camera devices is provided. The image processing device includes a key frame extracting unit, a corresponding frame acquiring unit, a frame blending unit, and a video abstract generating unit. The key frame extracting unit is configured to extract a key frame from a video acquired by each of the plurality of camera devices. The corresponding frame acquiring unit is configured to, for each extracted key frame, determine a neighbor camera device having monitor area adjacent to the monitor area of the key frame, and acquire from the neighbor camera device a corresponding video frame which is simultaneous to the key frame. The frame blending unit is configured to blend the key frame acquired by each of the camera devices and the corresponding video frame to generate a panorama key frame. The video abstract generating unit is configured to generate a sequence formed by panorama key frames for the key frames as a video abstract of the monitoring system.

Aspects of the disclosure further include a monitoring system including the image processing apparatus according to embodiments of the present disclosure.

According to the embodiments of the present disclosure, a wider range of panorama video abstract is provided by blending monitor results of multiple camera devices so that monitoring for a target or an event in the monitor area is provided more comprehensively.

BRIEF DESCRIPTION OF THE DRAWINGS

The present disclosure may be better understood by reference to the following description which is given in conjunction with the drawings, in which the same or similar reference numerals in all the drawings to refer to the same or similar parts. The drawings together with the following detailed description are contained in the present specification and form a portion of the present specification, and serve to further illustrate preferred embodiments of the present disclosure and to explain the principles and advantages of the present disclosure. In the drawings.

EMBODIMENTS

Figure 1:
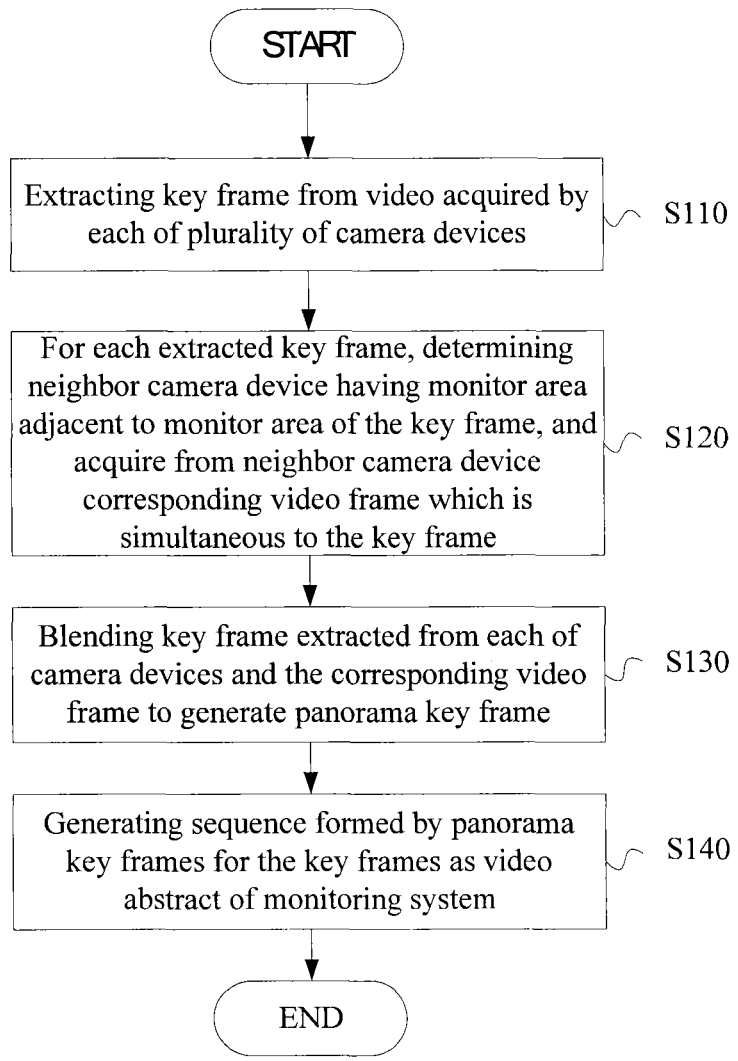
FIG. 1 is a flow chart showing a process example of an image processing method according to an embodiment.

The embodiments of the present disclosure will be explained below with reference to the drawings. Elements and features described in one drawing or one embodiment according to the present disclosure may be combined with the elements and features shown in one or more other drawings or embodiments of the present disclosure. It should be noted that the illustration and description of the components and process known to those skilled in the art and irrelevant to the present disclosure are omitted for clarity in the drawings and explanation.

An embodiment of the present disclosure is an image processing method for a monitoring system including multiple camera devices. The camera devices may include a fixed camera device or a movable camera device.

Herein, "a fixed camera device" refers to a camera device whose position is fixed, while "a movable camera device" refers to a camera device whose position is movable. The fixed camera device may include, for example, a fixed camera known in the art which is fixed at a fixed facility in a monitor area, such as a wall, a telegraph pole, etc. It should be noted that although being referred to as the fixed camera device, the fixed camera device may have a certain degree of freedom, for example, its shooting angle, focal distance, etc., may be changed, and accordingly the fixed camera devices may have different shooting areas. The movable camera device may not be fixed on a fixed facility, thus in addition to the degrees of freedom such as shooting angle, focal distance, etc., the position of the movable camera device may be changed as needed. According to a specific application, the movable camera device may include various movable apparatuses with camera function. For example, the movable camera device may be a camera, a mobile phone, or a wearable electronic apparatus such as smart glasses which are hold or worn by a specific person and move with the person to function as the movable camera device. Furthermore, the movable camera device may also include, for example, a movable apparatus provided with a camera device, such as a telepresence robot known in the art, which can move with a driving mechanism such as a wheel or a track according to a control signal.

As shown in FIG. 1, in step S110, a key frame is extracted from a video acquired by each of multiple camera devices.

The key frame refers to one or multiple frames representative of the content of a video, and the key frame may be a frame corresponding to a relatively special event in the video. Specifically, the multiple frames may either be multiple frames discontinuous in time, or be a sequence of frames (a video clip) continuous in time. In other words, the key frame referred to herein may be a single frame, multiple frames discontinuous in time, a video clip or multiple video clips.

The key frame may be extracted by multiple methods known in the art, for example, a method based on shot boundary, a method based on frame image information, a method based on movement analysis, and a method based on clustering. (For example, see Jialiang H A N, Yu W U, "Key frame extraction based on rough set and SVM", Computer Applications and Software, Vol. 29 No. 6, June 2012).

Next, a scenario-based key frame extracting process is briefly described only as an example.

For a camera device in the monitoring system, the video captured by the camera device may firstly be segmented into several scenes, in which each scene is formed by a series of video sequences continuous in time.

The scenes may be segmented by analysis based on color, texture, border or movement feature and the like. For example, each scene may be obtained by extracting main colors of the each of video frames and clustering according to similarity of the frames.

Specifically, taking a scene segmenting manner based on color as an example, a value of a color space of each frame may be calculated firstly. The color space may be of the type such as RBC, YCbCr, HSV, and HMMD, etc. A certain video frame may be vectorized according to a parameter value thereof in the color space, a normalized color histogram may be calculated to obtain the percentage occupied by each color in the entire picture, and the color with the largest percentage is determined as the main color of the frame. A series of continuous frames in the video may be segmented, by clustering, into several continuous sequences, in which each sequence corresponds to a scene.

After the video is segmented into several scenes, for each of the scenes, a key frame may be determined therein. Specifically, the key frame may be determined based on image features, sound features or a combination of the both.

Specifically, for example, the key frame may be determined according to an image feature such as the movement feature of the image, or a sound feature such as laugh, applause, abnormal sound (e.g., sounds of gunshot, breaking glasses, scream, or fight) in the audio. Furthermore, a final key frame result of a scene may be acquired based on both the key frame result determined according to the image feature and the key frame result determined according to the sound feature. For example, if there is an overlapping between the key frame result (it may include sequence of multiple frames) determined according to the image feature and the key frame result determined according to the sound feature, the overlapping frames may be determined as the final key frame result. Alternatively, by comparing a duration and energy of the key frame results determined according to the image feature and the sound feature, for example, the key frame result whose duration or energy is larger is selected as the final key frame result.

However, it can be understood by those skilled in the art that, in addition to the above-described example process of extracting the key frame based on the scene, other manners may be used to extract the key frames. For example, some frames which vary relatively severely can be selected as the key frames, e.g., by movement detecting, based on the image feature, without segmenting the scenes. Specifically, the movement detection may be performed by an inter-frame difference method, i.e., based on the difference between two or more continuous frames, or by other methods, such as background subtraction, optical flow method and movement energy method. Additionally, the key frame may be determined based on the sound feature by detecting a specific event (for example, detecting abnormal sound) in respective audio signals. For example, firstly models of those abnormal sounds may be trained, and the position of the abnormal event in the video is found by pattern recognition method, thus the corresponding key frame is determined.

It should be noted that, in the image processing method according to the present embodiment, the step of extracting the key frame and other corresponding steps which will be described later may be performed in real time in a monitoring process (for example, once a specific trigger event is detected in the captured video, corresponding key frame is extracted), according to a predetermined timing (for example, periodically), according to a predetermined trigger condition (for example, when the captured monitor video reaches a predetermined duration or a predetermined storage amount), or according to an operating instruction (for example, when the operator sends an instruction of generating a video abstract).

Furthermore, in the case that the camera device (for example, a portable intelligent apparatus such as smart phone, smart glasses) has a function of extracting the key frame, the step of acquiring the key frame may include directly acquiring from the camera device the key frame determined by the camera device.

Still referring to FIG. 1, in step S120, for each extracted key frame, a neighbor camera device having monitor area adjacent to the monitor area of the key frame is determined, and a corresponding video frame which is simultaneous to the key frame is acquired from the neighbor camera device.

As described above, the camera device may include a fixed camera device and a movable camera device. According to operation parameters of the fixed camera device and the movable camera device, they each may have a specific monitor area. Specifically, the operation parameters of the fixed camera device may include, for example, azimuthal angle, range of viewing angle, and focal distance, while the operation parameters of the movable camera device include, for example, position, azimuthal angle, range of viewing angle, and focal distance. Accordingly, for the key frame extracted from the video of a camera device, a neighbor camera device with respect to the camera device acquiring the key frame is determined according to current operation parameters of the fixed camera device or the movable camera device in the monitoring system. It should be noted, the neighbor camera devices mentioned herein means the camera devices having monitor areas adjacent to each other, not necessarily means that the positions of the camera devices per se are adjacent.

The corresponding frame which is simultaneous to the key frame may be determined according to time axis information of video frames captured by the camera devices.

Next, in step S130, the key frame extracted from each of the camera devices and the corresponding video frame are blended to generate a panorama key frame.

As known in the art, image blending refers to a technique for blending two or more images into a new image by a particular algorithm. As the objects of the blending, the key frame and the corresponding video frame may contain an overlapping part. In this case, the image blending may be performed by operations such as registration, mosaic and corresponding image process (for example, making the image features such as resolution, gray scale, and color as coincident as possible), and thus the blended image may appear to be a seamless panorama image. Furthermore, the embodiment according to the present disclosure is also applicable to the case where there is no overlapping part between the key frame and the corresponding video frame. In this case, position relationship between the images may be estimated, for example, according to the operation parameters of corresponding camera devices, and the key frame and the corresponding video frame are combined according to the estimated relative position. Furthermore, the combined image features such as resolution, gray scale and color may be approached to each other by image processing. Accordingly, even if the seamless-mosaic panorama image can not be obtained, a reference function similar to the seamless-mosaic panorama image may be provided according to the estimated relative position.

The image blending may be implemented in multiple manners known in the art. For example, reference is made to Xiangyang ZHAO, Limin D U, "An Automatic and Robust Image Mosaic Algorithm", Journal of Image and Graphics, Vol. 9, No. 4, April 2004.

Furthermore, a key frame of a camera device may be blended with the corresponding video frames of a predetermined number of neighbor camera devices or of the neighbor camera devices in a predetermined range to obtain the panorama key frame. In other words, the number of the video frames contained in the panorama key frames to be obtained or the range of the monitor area to be contained in the panorama key frames may be preset.

According to a specific embodiment, a key frame may be blended with the corresponding video frames from a predetermined number of neighbor camera devices with the key frame as center, to generate the panorama key frame. Alternatively, the key frame may not be the center of the panorama key frame. For example, the panorama key frame may contain the video frames from n specific adjacent camera devices, and the positions of the video frames of the n adjacent camera devices in the panorama key frame may be fixed.

Still referring to FIG. 1, next, in step S140, a sequence formed by panorama key frames for the key frames is generated as a video abstract of the monitoring system.

Corresponding to the extracted key frame, the generated panorama key frame may contain a single frame, multiple frames discontinuous in time, a video clip or multiple video clips. Accordingly, the video abstract generated according to the image processing method of the embodiment of the present disclosure may include a single image, multiple images, a video clip or multiple video clips.

As compared with the existing manner of providing the video abstract formed by the captured image of a single camera device, monitoring for an object or an event in the monitor area may be provided more comprehensively by blending the key frame and the corresponding video frame in adjacent area and providing the video abstract formed by the blended panorama key frame.

For example, in case that an object or an event occurs across different camera devices in the monitor area, the object or event can be known conveniently and comprehensively, and it is not necessary to separately analyze and compare the video abstracts of the camera devices.

Figure 2:
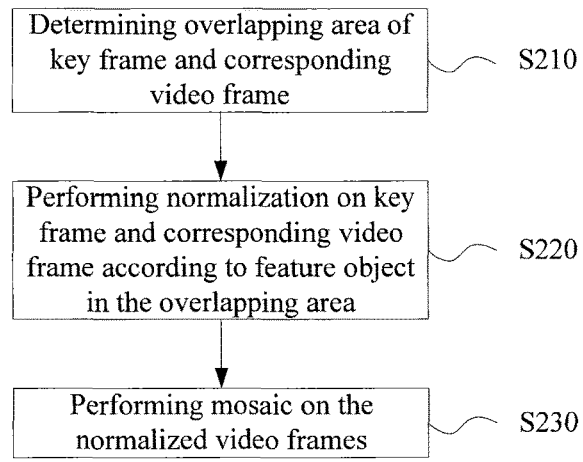
FIG. 2 is a flow chart showing a process example of generating a panorama key frame in an image processing method according to an embodiment.

Next, a process of generating the panorama key frame in the image processing method according to the embodiment is explained with reference to FIG. 2.

In step S210, overlapping area between the key frame extracted from the video captured by a certain camera device and the corresponding video frame which is simultaneous to the key frame acquired from the neighbor camera device is determined.

There may be an overlapping part in the shooting ranges of the camera devices having adjacent monitor areas and having similar viewing angles (for example, the camera devices at a distant from each other less than the field width thereof and having parallel viewing angle directions, or wide-angle camera devices whose viewing angle difference is less than a predetermined value). Correspondingly, the image area corresponding to the overlapping part contained in the obtained image is referred to as the overlapping area.

In this embodiment, it is assumed that there is an overlapping area between the key frame and the corresponding video frame of the neighbor camera device. Regarding the case that there is no overlapping area between the key frame and the corresponding video frame, the captured image may have the overlapping area by, for example, adjusting the operation parameters of the camera device as necessary.

The overlapping area of the video frames of the neighbor camera devices may be determined according to the monitor area determined based on the operation parameters of the camera devices, or the overlapping area of the video frames of the neighbor camera devices may be determined by image matching. For example, in case that a spatial form of application location is known, an actual spatial range corresponding to the image captured by the camera device may be estimated according to the position and the viewing angle of the camera device, thus the overlapping area of the video frames captured by the neighbor camera devices can be estimated. Alternatively, the overlapping area may be determined by matching corresponding parts near the image boundary of the video frame of the neighbor camera device. Furthermore, a combination of the above manners can be employed, for example, the overlapping position may be estimated based on the operation parameters of the camera device, and then the overlapping area is determined by the image matching.

In step S220, normalization is performed on the key frame and the corresponding video frame according to a feature object in the overlapping area.

For example, the feature object may be an article or a line in the overlapping area.

The key frame and the corresponding video frame are processed to have the same scale by the normalization.

Next, in step S230, mosaic is performed on the normalized video frames.

The mosaic for the video frame may be performed in an image mosaic manner known in the art, such as, the method of image registration and mosaic based on feature points.

Additionally, the process of generating the panorama key frame may include other image processing according to specific application. For example, in case that the image features of the key frame, such as resolution, gray scale and color, are different from those of the corresponding video frame, the process of generating the panorama key frame may include the image processing process of making the image features such as resolution, gray scale and color of the video frames forming the panorama key frame be coincident.

Furthermore, in case that the feature such as the resolution of relevant video frame used for generating the panorama key frame does not satisfy the requirement for generating the panorama key frame, the captured image from the camera device may be made satisfy a corresponding requirement by adjusting the operation parameters of corresponding camera device such as range of viewing angle and focal distance.

Additionally, in case that there is image distortion in the relevant video frame used for generating the panorama key frame (for example, there may be a certain distortion in the captured image acquired by a spherical (fish eye) camera), the distorted image may be corrected to be the plane image conforming with visual sense by respective image correction processing to generate the panorama key frame suitable for viewing.

The process example of the image processing method according to an aspect of the present disclosure is explained above. Next, a configuration example of the image processing device according to another aspect of the present disclosure will be explained.

Figure 3:
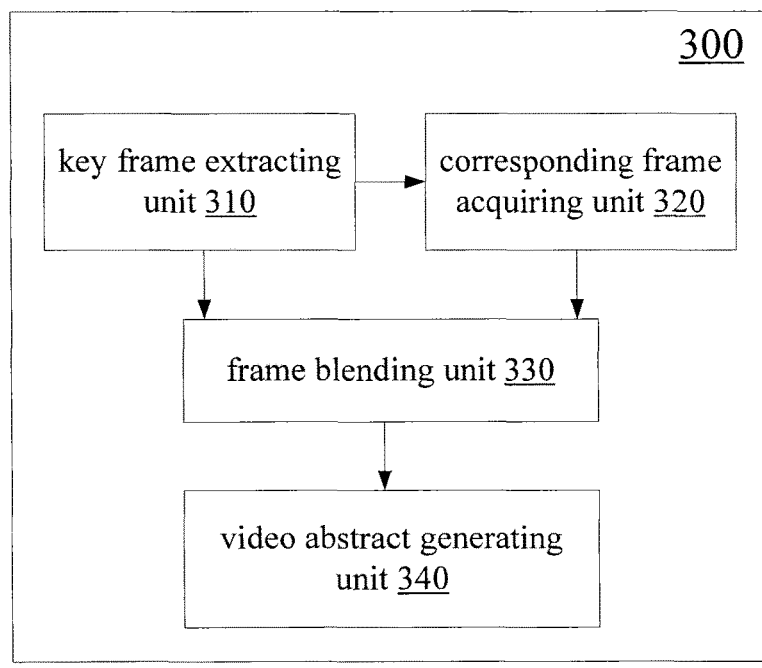
FIG. 3 is a block diagram showing a configuration example of an image processing device according to an embodiment.

As shown in FIG. 3, according to an embodiment of the present disclosure, an image processing device 300 includes a key frame extracting unit 310, a corresponding frame acquiring unit 320, a frame blending unit 330 and a video abstract generating unit 340.

The image processing device 300 is used for a monitoring system including multiple camera devices, where the camera device may be a fixed camera device such as a fixed camera, or a movable camera device. The movable camera device may include various mobile apparatuses having a camera function, for example, a camera, a mobile phone, a wearable electronic apparatus such as smart glasses. Furthermore, the movable camera device may include the mobile apparatus provided with a camera device, such as a telepresence robot.

The key frame extracting unit 310 is configured to extract the key frame from the video acquired by each camera device in multiple camera devices.

The key frame extracting unit 310 may extract the key frame according to image feature, sound feature of the video or the combination thereof.

Additionally, in case that the camera device has a function of extracting the key frame, the key frame extracting unit 310 may be configured to directly acquire from the camera device the key frame determined by the camera device.

The corresponding frame acquiring unit 320 is configured to, for each extracted key frame, determine a neighbor camera device having monitor area adjacent to the monitor area of the key frame, and acquire from the neighbor camera device a corresponding video frame which is simultaneous to the key frame.

In case that the camera device in the monitoring system includes a movable camera device, the corresponding frame acquiring unit may include a position relationship determining unit (not illustrated in the figure). The position relationship determining unit may be configured to determine the neighbor camera device of the camera device obtaining the key frame according to current operation parameters of the movable camera device.

The operation parameters of the movable camera device may include, for example, position, azimuthal angle, range of viewing angle, or focal distance.

The frame blending unit 330 is configured to blend the key frame acquired by each of the camera devices and the corresponding video frame to generate a panorama key frame.

According to a specific embodiment, the frame blending unit may be configured to, with a key frame as center, blend the key frame with the corresponding video frames from a predetermined number of neighbor camera devices, to generate the panorama key frame. However, as mentioned above, in other embodiments, the key frame may not be the center of the panorama key frame, and the panorama key frame may be formed by video frames of a predetermined number of neighbor camera devices, for example, in a fixed relative position relationship.

The video abstract generating unit 340 is configured to generate a sequence formed by panorama key frame for the key frames as a video abstract of the monitoring system.

The video abstract formed by the panorama key frames may be a single image, multiple images, a video clip or multiple video clips.

Figure 4:
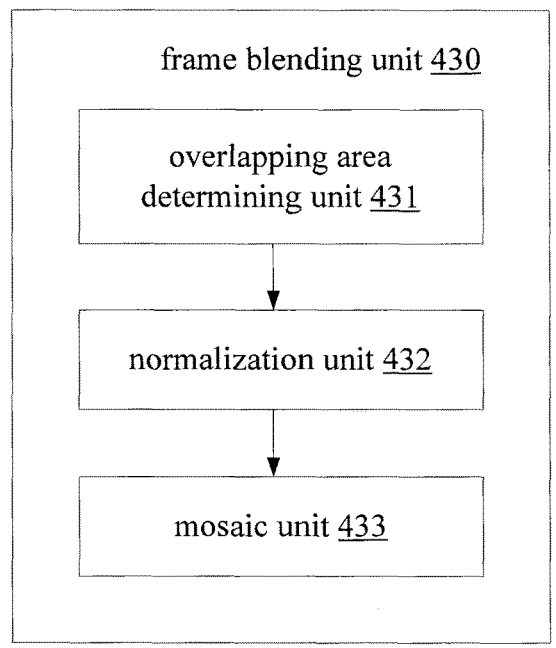
FIG. 4 is a block diagram showing a configuration example of a frame blending unit of an image processing device according to an embodiment.

FIG. 4 shows a configuration example of the frame blending unit of the image processing device according to an embodiment.

The frame blending unit 430 includes an overlapping area determining unit 431, a normalization unit 432 and a mosaic unit 433.

The overlapping area determining unit 431 is configured to determine an overlapping area of the key frame extracted from each of the camera devices and the corresponding video frame. The overlapping area of the video frames of adjacent camera devices may be determined according to the monitor area determined based on the operation parameters of the camera devices, or the overlapping area of the video frames of the adjacent camera devices may be determined by image matching.

The normalization unit 432 is configured to perform normalization on the key frame and the corresponding video frame according to a feature object in the overlapping area. For example, the feature object may be an article or a line in the overlapping area.

The mosaic unit 433 is configured to perform mosaic on the normalized video frames.

Furthermore, according to the requirement, the image processing device according to the embodiment of the present disclosure may include other image processing unit, for example, an image processing unit making the image features such as resolution, gray scale, and color of the video frames used for generating the panorama key frame be coincident, or a unit for correcting the distorted image.

According to another aspect of the present disclosure, a monitoring system is provided.

Figure 5:
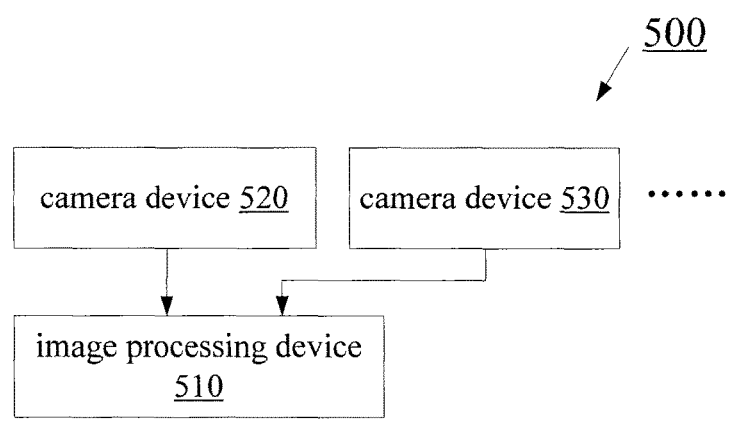
FIG. 5 is a block diagram showing a configuration example of a monitoring system according to an embodiment.

As shown in FIG. 5, a monitoring system 500 includes multiple camera devices 520, 530, . . . , and an image processing device 510. The image processing device may have the configuration of the image processing device according to the embodiments of the present disclosure, or any combination thereof. The image processing device 510 acquires the key frame from camera devices, blends the key frame with corresponding video frame of the neighbor camera device to generate the panorama key frame, and generates the video abstract based on the panorama key frame.

As an example, each step of the above-described method as well as each constitution module and/or unit of the above-described apparatus may be implemented as software, firmware, hardware, or a combination thereof. In the case of software or firmware, program constituting the software for implementing the above-described method may be loaded onto the computer (e.g., a general purpose computer 600 shown in FIG. 6) having a dedicated hardware structure via a storage medium or a network, and the computer can execute various functions in the case that the computer is installed with various programs.

Figure 6:
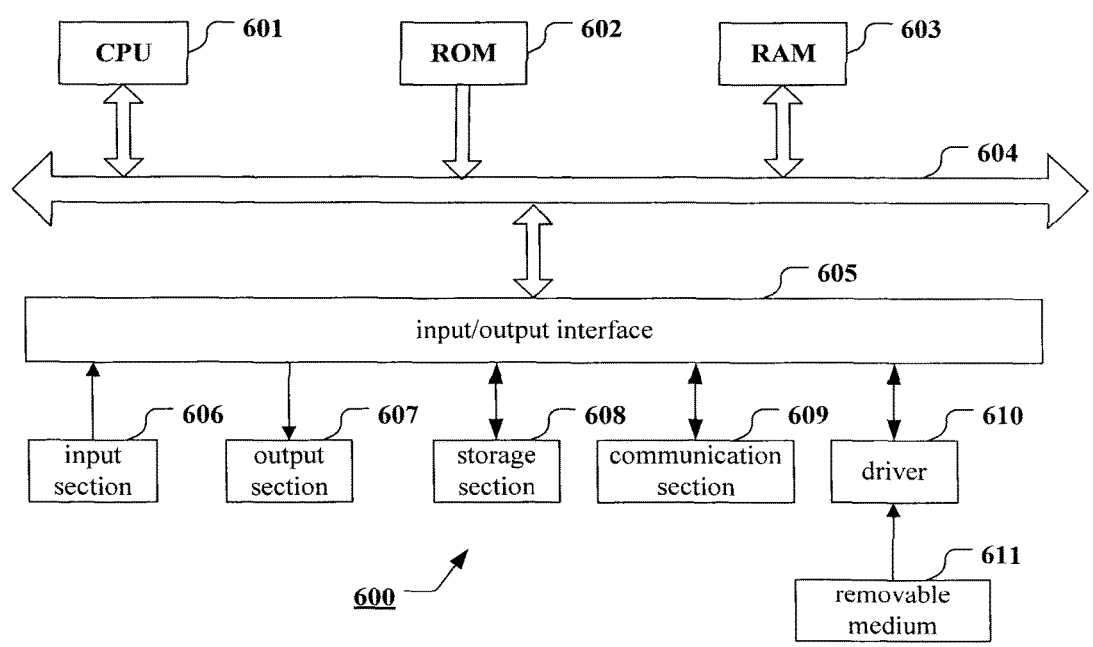
FIG. 6 is a block diagram showing an exemplary structure of a computer for implementing a method and a device according to the present disclosure.

In FIG. 6, a calculation processing unit (i.e., CPU) 601 performs various processing according to the program stored in a read only memory (ROM) 602 or the program loaded from the storage section 608 to a random access memory (RAM) 603. In the RAM 603, the data required by CPU 601 to execute various processing is stored as necessary. CPU 601, ROM 602 and RAM 603 are linked to each other via a bus 604. Input/output interface 605 is also linked to the bus 604.

The following components are linked to the input/output interface 605: an input section 606 (including a keyboard, a mouse, etc.), the output section 607 (including a display, such as a cathode ray tube (CRT), a liquid crystal display (LCD), etc., and a speaker, etc.), the storage section 608 (including a hard disk, etc.), and the communication section 609 (including a network interface card such as a LAN card, a modem, etc.). The communication section 609 performs a communication process via a network, such as the Internet. The drive 610 may also be linked to the input/output interface 605 as needed. Removable medium 611 such as disk, optical disk, magneto-optical disk, or a semiconductor memory, is mounted on the drive 610 as needed, such that a computer program read out therefrom is installed into the storage section 608 as needed.

In the case of implementing the above-described series of processing by software, the program constituting the software is installed via the network such as the Internet or a storage medium such as the removable medium 611.

It should be appreciated by those skilled in the art that, such storage medium is not limited to the removable medium 611 shown in FIG. 6 in which the program is stored and distributed separately from the apparatus to provide program to the user. The examples of the removable medium 611 include the disk (including a floppy disk (registered trademark)), CD (including compact disc read-only memory (CD-ROM) and a digital versatile disk (DVD)), a magneto-optical disk (including a mini disc (MD) (registered trademark)) and a semiconductor memory. Alternatively, the storage medium may be a ROM 602, a hard disk contained in the storage section 608 and so on, in which the program is stored, and is distributed to users together with the apparatus containing them.

Embodiments of the present disclosure also relates to a program product in which machine-readable instruction code are stored. When the instruction code are read and executed by a machine, the above-described method according to the embodiment of the present disclosure may be executed.

Correspondingly, the storage medium used for carrying the program product in which machine-readable instruction code is stored is included in the present disclosure. Said storage medium includes but not limited to, floppy diskettes, optical disks, magneto-optical disk, memory card, memory stick and so on.

In the above description of the specific embodiments of the present disclosure, the descried and/or illustrated features directed to an embodiment may be used in the same or similar manner in one or more other embodiments, and combined with the features in other embodiments, or instead of the features in other alternative embodiments.

It should be emphasized, the term "comprise/comprises" when used herein refers to the presence of features, elements, steps or components, but do not preclude the presence or addition of one or more other features, elements, steps or components.

In the above-described embodiments and examples, the reference numerals constituted of numbers are used to represent the respective step and/or unit. Those ordinary skilled in the art should appreciate that those reference numerals are only for ease of description and drawing, and do not represent the order thereof or any other limitation.

Furthermore, the method according to the present disclosure is not limited to the time sequence described in the specification is performed, and may also be performed in parallel or independently in accordance with other time sequence. Thus, the order of execution of the method described in this specification does not limit the technical scope of the present disclosure.

Although in the above the present disclosure has been disclosed by the description of the specific embodiments of the present disclosure, it should be understood that all of the above-described embodiments and examples are illustrative not restrictive. Various modifications, improvements or equivalents of the disclosure may be designed by those skilled in the art within the spirit and scope of the appended claims. These modifications, improvements or equivalents should also be considered within the scope of the present disclosure.

The invention claimed is:

1. An image processing method for a monitoring system comprising a plurality of movable camera devices, each position of the plurality of movable devices being movable, the method comprising:

extracting, using processing circuitry, a key frame from a video acquired by each of the plurality of movable camera devices;

for each extracted key frame, determining, from among the plurality of movable camera devices, a neighbor movable camera device having monitor area adjacent to the monitor area of the key frame using current operation parameters of the plurality of movable camera devices, each of the current operation parameters including each position and at least one of range of viewing angle and focal distance of the plurality of movable camera devices, and acquiring from the neighbor movable camera device a corresponding video frame which is simultaneous to the key frame;

adjusting the at least one of range of viewing angle and focal distance of at least one of the plurality of movable camera devices in a case a resolution of the corresponding video frame from the at least one of the plurality of movable camera devices does not satisfy a requirement for generating a panorama key frame;

blending the key frame extracted from each of the movable camera devices and the corresponding video frame to generate a panorama key frame; and generating a sequence formed by panorama key frames for the key frames as a video abstract of the monitoring system.

2. The image processing method of claim 1, wherein the step of generating the panorama key frame comprises:
determining an overlapping area of the key frame and the corresponding video frame;
performing normalization on the key frame and the corresponding video frame according to a feature object in the overlapping area; and
performing mosaic on the normalized video frames.

3. The image processing method of claim 1, wherein in the step of generating the panorama key frame, the key frame is blended with the corresponding video frames from a predetermined number of neighbor movable camera devices with the key frame as center, to generate the panorama key frame.

4. The image processing method of claim 1, wherein the key frame is extracted based on image feature and/or sound feature of the video.

5. The image processing method of claim 1, wherein the current operation parameter of the movable camera devices further comprises azimuthal angle.

6. The image processing method of claim 1, wherein the movable camera device comprises smart glasses.

7. The image processing method of claim 1, wherein
the determining further determines the neighbor movable camera device using both of the range of viewing angle and the focal distance of the plurality of movable camera devices, and
the adjusting adjusts both of the range of viewing angle and the focal distance of the at least one of the plurality of movable camera devices in the case the resolution of the corresponding video frame from the at least one of the plurality of movable camera devices does not satisfy the requirement for generating a panorama key frame.

8. An image processing device for a monitoring system comprising a plurality of movable camera devices, each position of the plurality of movable devices being movable, the image processing device comprises:
processing circuitry configured to
extract a key frame from a video acquired by each of the plurality of movable camera devices;
for each extracted key frame, determine, from among the plurality of movable camera devices, a neighbor movable camera device having monitor area adjacent to the monitor area of the key frame using current operation parameters of the plurality of movable camera devices, each of the current operation parameters including each position and at least one of range of viewing angle and focal distance of the plurality of movable camera devices, and acquire from the neighbor movable camera device a corresponding video frame which is simultaneous to the key frame;
adjust the at least one of range of viewing angle and focal distance of at least one of the plurality of movable camera devices in a case a resolution of the corresponding video frame from the at least one of the plurality of movable camera devices does not satisfy a requirement for generating a panorama key frame;
blend the key frame acquired by each of the movable camera devices and the corresponding video frame to generate a panorama key frame; and
generate a sequence formed by panorama key frames for the key frames as a video abstract of the monitoring system.

9. The image processing device of claim 8, wherein the processing circuitry is configured to:
determine an overlapping area of the key frame and the corresponding video frame;
perform normalization on the key frame and the corresponding video frame according to a feature object in the overlapping area; and
perform mosaic on the normalized video frames.

10. The image processing device of claim 8, wherein the processing circuitry is configured to blend the key frame with the corresponding video frames from a predetermined number of neighbor movable camera devices with the key frame as center, to generate the panorama key frame.

11. The image processing device of claim 8, wherein the processing circuitry is configured to extract the key frame based on image feature and/or sound feature of the video.

12. The image processing device of claim 8, wherein the current operation parameter of the movable camera device further comprises azimuthal angle.

13. The image processing device of claim 8, wherein the movable camera device comprises smart glasses.

14. A monitoring system comprising the plurality of movable camera devices and the image processing device according to claim 8.

* * * * *